Sept. 27, 1949.　　　F. H. JOHNSON ET AL　　　2,483,054
ELECTRIC CONTROLLER
Original Filed March 22, 1943　　　　　　　　5 Sheets-Sheet 1
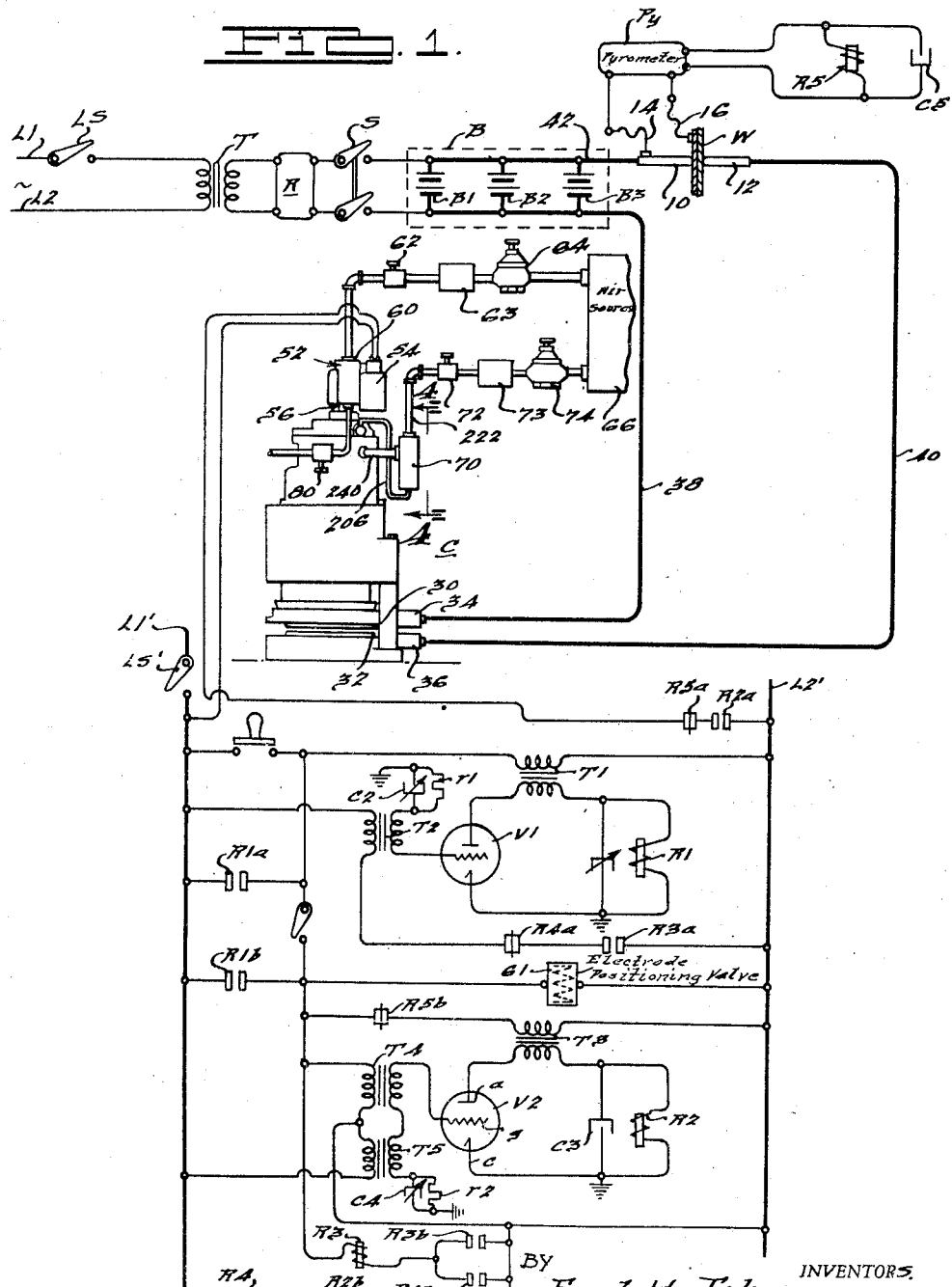
INVENTORS.
Fred H. Johnson,
Chester F. Leathers.
ATTORNEYS.

Sept. 27, 1949.　　F. H. JOHNSON ET AL　　2,483,054
ELECTRIC CONTROLLER
Original Filed March 22, 1943　　　　5 Sheets-Sheet 2
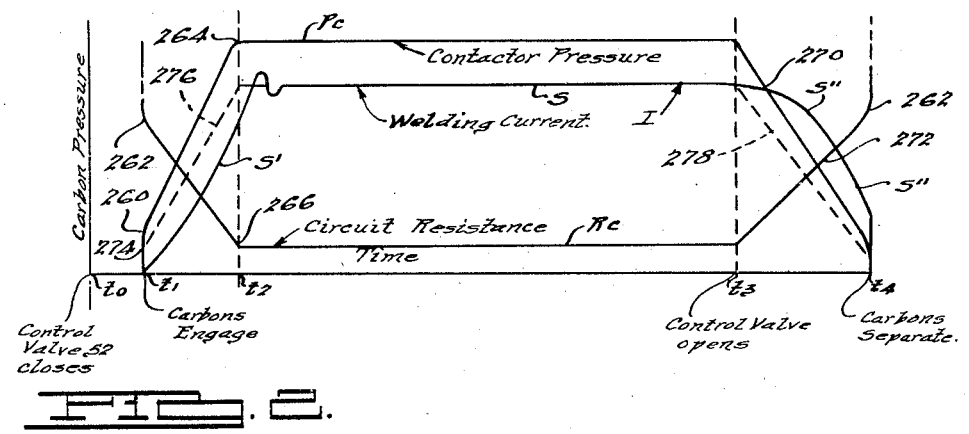
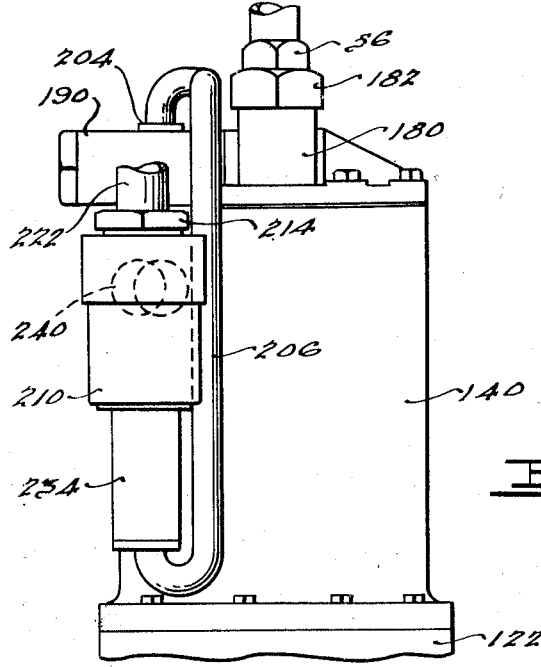
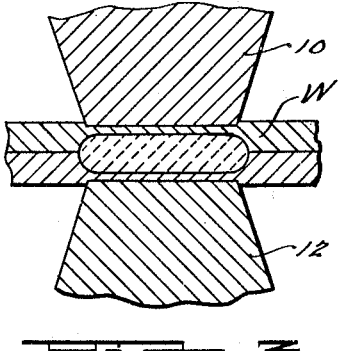
INVENTORS.
Fred H. Johnson,
BY Chester F. Leathers.
Harness, Dickey & Pierce.
ATTORNEYS Sept. 27, 1949.　　　F. H. JOHNSON ET AL　　　2,483,054
ELECTRIC CONTROLLER
Original Filed March 22, 1943　　　　　　　　5 Sheets-Sheet 3
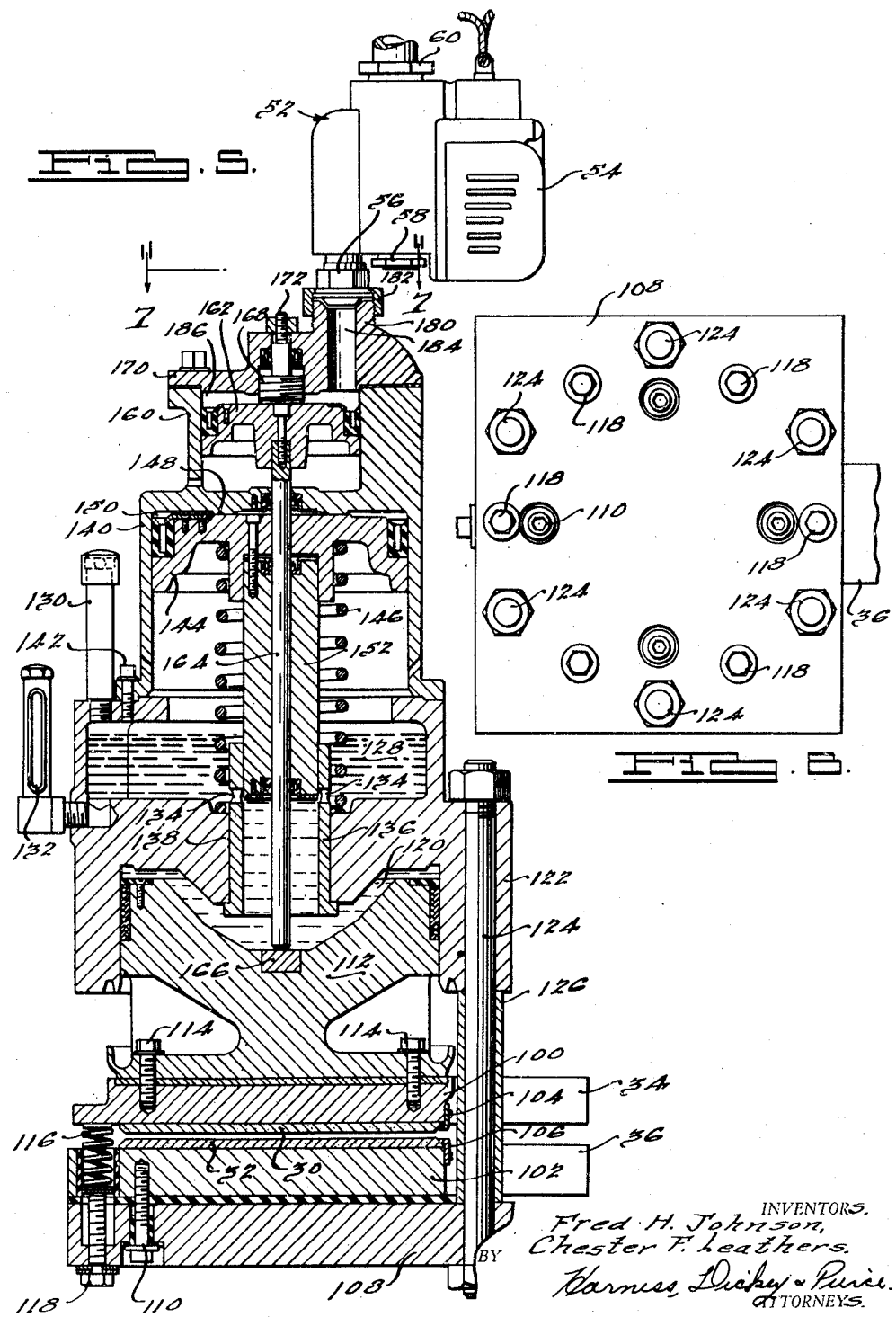
INVENTORS.
Fred H. Johnson,
Chester F. Leathers.
BY Harness, Dickey & Pierce.
ATTORNEYS.

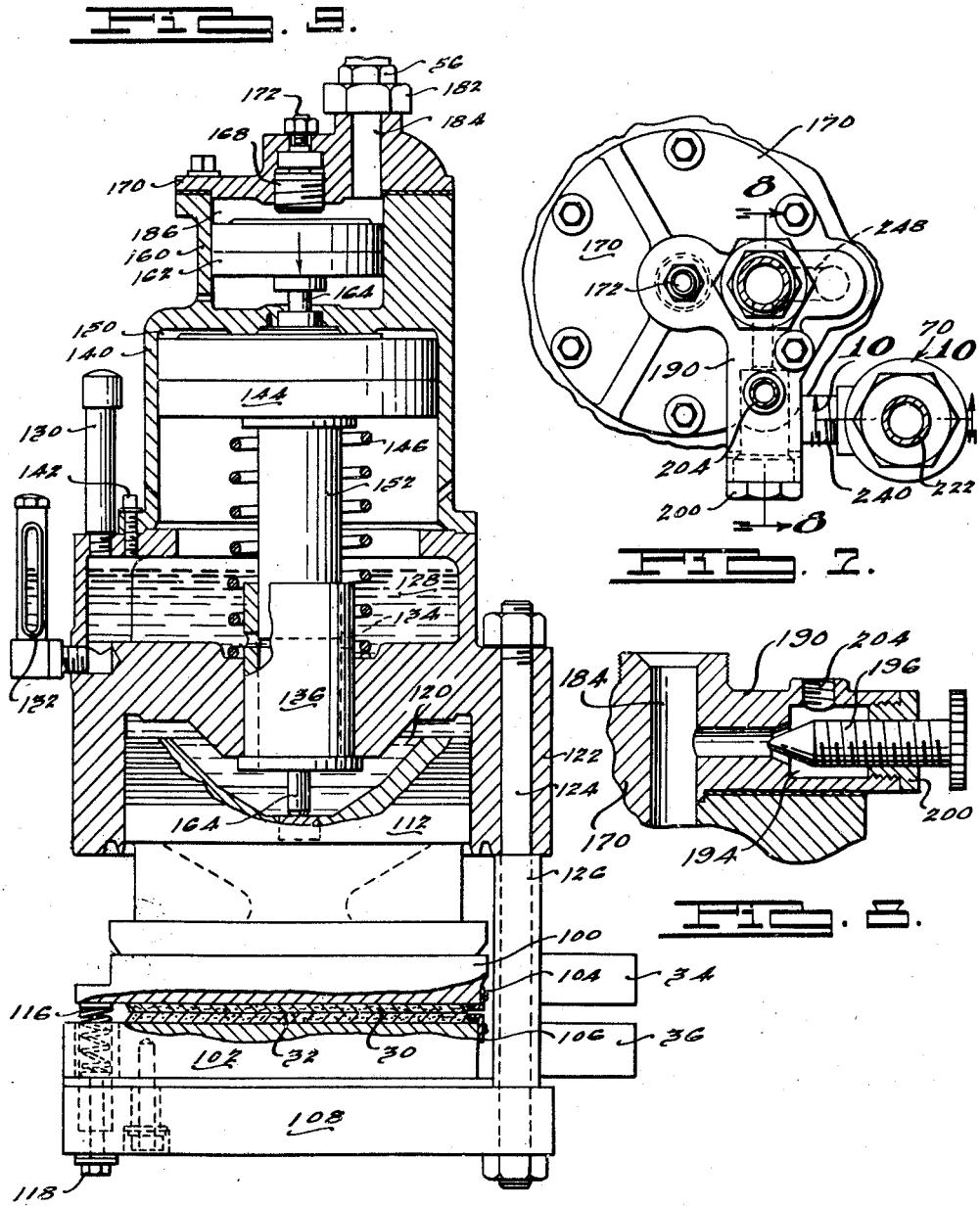

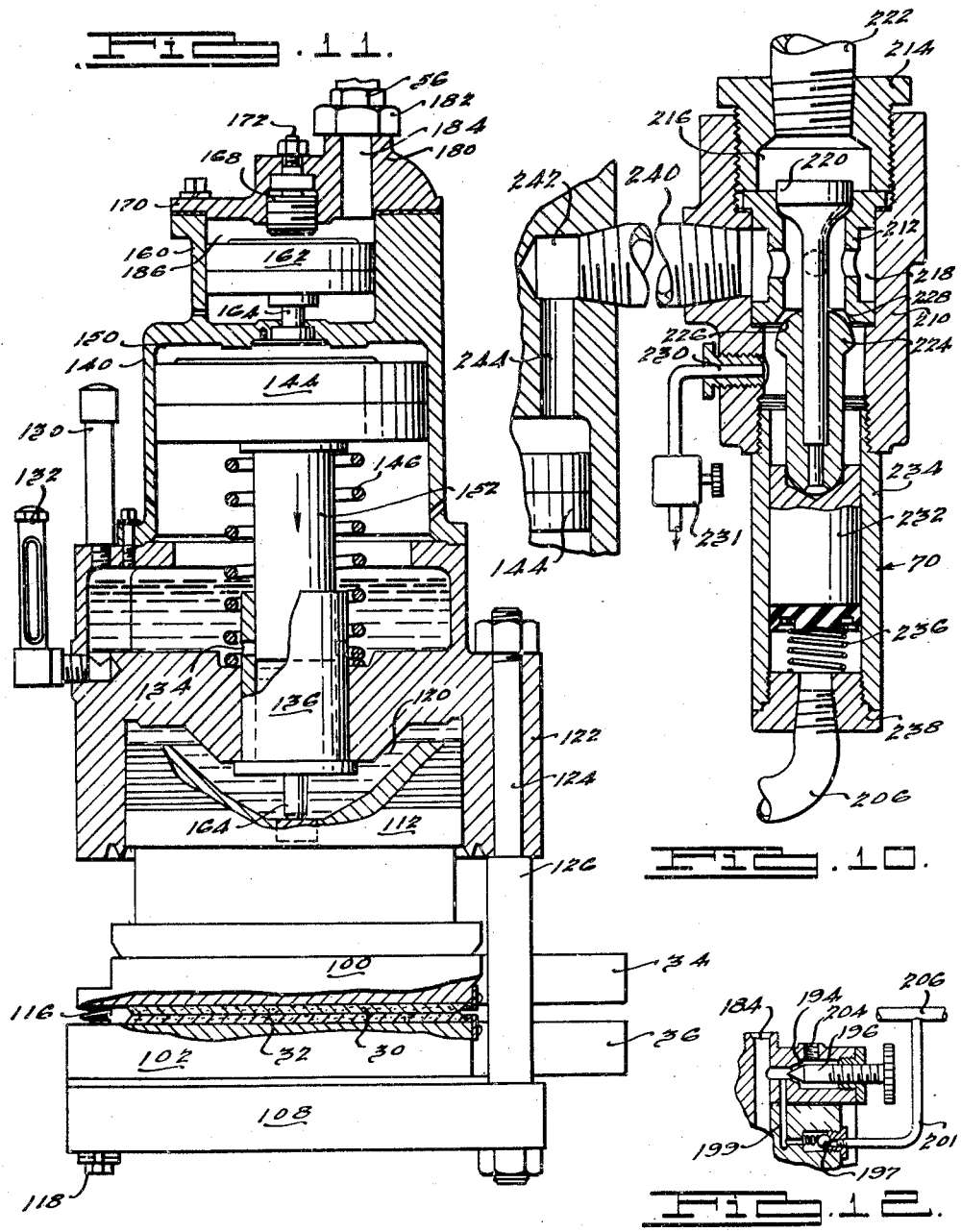

Patented Sept. 27, 1949

2,483,054

UNITED STATES PATENT OFFICE 2,483,054

ELECTRIC CONTROLLER

Fred H. Johnson, Pleasant Ridge, and Chester F. Leathers, Detroit, Mich.; said Leathers assignor to Progressive Welder Company, Detroit, Mich., a corporation of Michigan Original application March 22, 1943, Serial No. 479,998, now Patent No. 2,452,573, dated November 2, 1948. Divided and this application May 28, 1947, Serial No. 751,102

19 Claims. (Cl. 201—51)

The present invention relates to apparatus for controlling electric circuits and in particular is directed to an improved electric switch mechanism which may be utilized to directly control the current flow from batteries or equivalent current storage element as the source of power to welding electrodes.

The principal objects of the present invention are to provide an apparatus for resistance welding or other purposes utilizing means whereby a high value current flow may be quickly interrupted in a controlled interval without destructive arcing at the point of circuit opening; to provide such an apparatus which is operable to gradually increase the current flow therethrough at the time of closing which may be at the beginning of a welding cycle and to gradually decrease the current flow through the circuit prior to opening of the circuit which may be at the conclusion of a welding cycle; to provide such an apparatus which may be repeatedly opened and closed to control current of high magnitude without a necessity for frequently replacing the circuit opening element; to provide such an apparatus which has an inherent characteristic so that prior to opening of the circuit controlled thereby it places in the circuit a sufficient amount of resistance to bring the value of the current flowing through the circuit to a minor fraction of the normal current flow therethrough representative of a substantial dissipation of the inductively stored energy of the circuit prior to opening of the circuit; to provide such an apparatus which is particularly adaptable to control the flow of current to welding electrodes from an energy stored apparatus such as a battery; to provide such an apparatus or contactor of the carbon pile type employing two or more carbon discs having co-engaging faces between which the current flows and which are separated to interrupt the current flow; to provide such a construction embodying improved means for applying pressure between the carbon elements so as to cause the current prior to its interruption to fall to a value representing a relatively small fraction of full current conducting value; and to provide such a contactor which may be readily and economically manufactured and which is capable, though of relatively small size, to handle extremely large current value.

With the above as well as other objects in view which appear in the following description and in the appended claims, a preferred but illustrative embodiment of the invention is shown in the accompanying drawings throughout the several views of which corresponding reference characters are used to designate corresponding parts and in which, Figure 1 is a diagrammatic view of a welding control system embodying the invention;

Fig. 2 is a diagrammatic view illustrative of the relation, during a welding cycle, between the contactor pressure, the resistance of the welding circuit and the current in the welding circuit;

Fig. 3 is a diagrammatic view, illustrating the engaging relation between the work and the electrodes of a resistance welding machine;

Fig. 4 is a fragmentary view, partly in elevation and partly in section, taken along the line 4—4 of Fig. 1;

Fig. 5 is a view in longitudinal central section of the contactor structure of Fig. 1;

Fig. 6 is a bottom view based upon Fig. 5;

Fig. 7 is a plan view, taken along the line 7—7 of Fig. 5;

Fig. 8 is a view in section taken along the line 8—8 of Fig. 7;

Fig. 9 is a view corresponding generally to Fig. 5, but showing the contactor elements in a second operating position;

Fig. 10 is a view in section, taken along the line 10—10 of Fig. 7;

Fig. 11 is a view corresponding generally to Figs. 5 and 9, but showing the contactor in a third operating position;

Fig. 12 is a fragmentary view of a modification of the invention.

This application is a division of our present co-pending application Serial No. 479,998, filed March 22, 1943, issued as Patent No. 2,452,573 on November 2, 1948, for "Welding method and apparatus."

It will be appreciated from a complete understanding of the present invention that in a generic sense the improvements thereof may be embodied in processes and apparatus differing widely from the herein disclosed processes and apparatus and may be utilized for purposes other than the herein described purposes. A preferred use of the invention is in connection with electric welding apparatus, such as resistance welding apparatus, and by way of illustration but not of limitation, the invention is so described herein.

The herein disclosed welding system uses one or more storage batteries, which generically may be arranged in various parallel series and series-parallel arrangements, so as to provide the proper output voltage and current capacity, as the source of current for delivery to the work through the associated electrodes and will thus be recognized as being of the stored energy type.

Various such systems have heretofore been proposed such, for example, as the system disclosed in the Woodrow Patent No. 1,183,264 and in the Thomson Patent No. 394,892. These systems are advantageous in that each current impulse has a maximum value which remains substantially uniform throughout at least the major portion of such impulse, as is indicated by the flat portions of the current curve I in Fig. 2. Because of this the entire welding circuit may be regarded as non-inductive during such major portion of each welding impulse. This factor eliminates substantial losses present in alternating current systems and in stored energy systems of the reactive type such, for example, as that disclosed in Chubb Patent No. 1,066,468. This feature also eliminates difficulties resulting from the variations in inductance of the welding circuit which are normally produced in making a series of welds which are distributed over the surface of relatively wide sheets. Stored energy systems are further advantageous for the reason that the recharging thereof may take place during the intervals between welds, and at a rate materially lower than the rate at which current is drawn from the apparatus in making a weld, thereby avoiding the drawing of heavy surge currents directly from the line.

So far as the present applicant is aware, however, the battery systems heretofore proposed have been commercially unsatisfactory because of the switching problems encountered in closing and in opening the circuit between the batteries and the welding electrodes. It will be understood that welding current intensities up to and in excess of 50,000 amperes are frequently required by present day welding operations. Although these currents are delivered at relatively low voltages, a very difficult switching problem is involved. These difficulties, as well as others, are efficiently and economically overcome in the practice of the present invention by introducing resistance into the battery circuit, preferably as an incident to both opening and closing operations, so that upon closing the circuit the current rises gradually and at a controllable rate from a minimum value to the maximum value. In opening the circuit, also, the current is gradually reduced from its maximum value to a minimum value which is low enough to enable it to be interrupted by relatively simple contactor mechanism without introducing objectionable arcing problems. In the practice of the present invention, consequently, each welding current impulse takes the form shown diagrammatically in Fig. 2, in which the current intensity I rises gradually from a zero value along the line s', maintains a uniform maximum value s throughout the major portion of the welding current impulse, and gradually falls off from the maximum value along the portion s".

Referring now to Figure 1, the illustrative control system there shown comprises a transformer T, which is connected through a conventional rectifier R and a selectively operable disconnect switch S to supply charging current to a storage battery unit B. The storage battery unit B is illustrated as comprising three batteries B1, B2 and B3, which are connected in parallel with each other, although, as aforesaid, other specific battery combinations may be utilized.

The battery unit B is serially connected through the hereinafter described contactor C to the welding circuit, which is illustrated as including a pair of electrodes 10 and 12, which may, as will be understood, be provided with suitable operating mechanism to enable them to be separated or applied to the work W with a predetermined pressure. The electrodes 10 and 12 are to be taken as illustrative of various welder arrangements.

The thermoelectric apparatus is illustrated as comprising a pair of thermocouple leads 14 and 16, which are connected, respectively, to the electrode 10 and to the work W, it being assumed for the purposes of the present description that the work W and the electrode 10 are formed of material such as aluminum and copper, respectively, which together form a thermocouple. The E. M. F. developed between the thermocouple elements 14 and 16 is applied to the input terminals of a pyrometer Py, the output terminals of which are connected to the coil of a usual electromagnetic control relay R5 and to a control condenser C5. It will be understood that when the thermoelectric E. M. F. developed between the leads 14—16, as the welding current heats the work, reaches a critical value, the pyrometer operates suitable circuit controlling means (not shown) and thereby connects relay R5 to a source of current. With this arrangement, the actual temperature measured is the temperature at the junction between the work and the face of the electrode, which, in the absence of shunting effects of neighboring welds, is accurately proportional to the temperature in the body of the weld nugget. In cases where shunting effects are substantial enough to require recognition, other couplings may be used, as disclosed in said copending application, Serial No. 442,463, now Patent No. 2,372,211, issued March 27, 1945, such, for example, as a coupling which responds to the temperature at the center of the face of the electrode. In the present description and claims, the apparatus is generically described as functioning in accordance with the temperature in the region of the weld, independently of the type of thermal coupling that is used.

In the broader aspects of the invention, various switching mechanisms may be utilized to control the completion and interruption of the welding circuit and to control the variation in the resistance thereof. One such contactor mechanism is disclosed in the copending application of Chester F. Leathers, Serial No. 432,194, filed February 25, 1942, now Patent No. 2,347,695, granted May 2, 1944. Preferably, the contactor C, which is described in detail in connection with Figs. 4 through 11, is employed. This contactor operates on the generally familiar carbon pile principle and, while various numbers of carbon or equivalent elements may be utilized in it, it is illustrated as comprising only two carbon elements 30 and 32, which elements are permanently electrically connected to terminals 34 and 36, respectively. Terminals 34 and 36, in turn, are permanently connected to conductors 38 and 40, which are connected, respectively, to one terminal of the battery unit B and to the electrode 12. Conductor 42 permanently connects the other terminal of the battery unit to electrode 10. In the normal position of the contactor C, shown in Fig. 1, the carbon elements 30 and 32 are separated from each other and the contactor thus serves, in its normal condition, to interrupt the welding circuit.

The contactor comprises combined pneumatic and hydraulic control mechanism for bringing the carbon elements 30 and 32 into engagement with each other and to variably control the pressure applied between them. This mechanism responds to the energization of the solenoid 54, associated with a usual electro-magnetically operated valve 52. This valve 52 is normally in the closed position, in which the pressure is relieved from the carbon elements 30 and 32, enabling them to assume the above-mentioned separated position. The valve 52 is opened at the beginning of a welding cycle, producing, first, a movement of the carbon elements into contact with each other at a relatively low pressure, and thereafter increasing pressure between these elements to a desired maximum value. As will be understood, when the pressure between these elements is at the minimum value, the resistance of the welding circuit is at a maximum and when this pressure is at its maximum value, the resistance to the welding circuit is at a minimum value. The rates of increase and decrease of the pressure between the engaged carbon elements are adjustable, and the minimum and maximum pressures are also adjustable. This allows accurate control of the rate of increase in the welding current from the minimum to the maximum value and similarly allows accurate control of the rate of decrease of this current. Similar control of the maximum and the minimum welding current values is afforded.

In the broader aspects of the invention, any suitable control system may be provided to control the energization and de-energization of the coil 54. The herein illustrated system is energized from a suitable source L1'—L2', which may be energized from the battery unit or otherwise, as will be understood. The system employs a pair of electric valves V1 and V2, which may be of any usual type, but are preferably of the three-element evacuated type. Each of the valves comprises an anode $a$, a control grid $g$, and an emissive cathode $c$, the heating circuit for which may be conventionally arranged and is omitted from the diagram in the interest of simplicity. The valves V1 and V2 are provided with associated electro-magnetically operated relays R1 and R2 provided, respectively, with contacts R1$a$ and R1$b$ and contacts R2$a$ and R2$b$.

It is thought that the remaining details of the system may best be understood from a description of the operation of the system as a whole. Assuming it is desired to effect a welding operation, the system may be conditioned for operation by closing line switches LS and LS', thereby energizing the line conductors L1—L2 and L1'—L2'. The former action energizes transformer T and assuming the disconnect switch S is closed, enables it to supply charging current to the battery unit B, which action brings the battery unit to a predetermined charge at a suitably determinable rate. Closure of the switch LS' completes an energizing circuit for the primary winding of transformer T5, which is associated with the grid of valve V2. Upon completion of this circuit, transformer T5 supplies charging current to the timing condenser C4, and consequently applies a blocking potential to the grid of valve V2, which prevents passage of current through this valve.

Assuming it is desired to effect a welding operation, the work W may be properly positioned between the electrodes and thereafter the illustrative pilot switch P may be closed. Closure of switch P completes an obvious energizing circuit for the primary winding of transformer T1, associated with the anode circuit of valve V1. Under the conditions stated, transformer T2, associated with the grid circuit of valve V1, is de-energized and such grid is, consequently, at a conducting potential. The energization of transformer T1, consequently, causes current to flow, during half cycles in which the anode $a$ is positive, through valve V1 and energizes relay R1. Upon being so energized, relay R1 closes its normally open contacts R1$a$ and R1$b$.

Closure of contacts R1$a$ completes a holding circuit in parallel to the pilot switch P, which may thereupon be released to the open position without interrupting the just initiated welding cycle. Closure of contacts R1$b$ completes an obvious energizing circuit for the solenoid of the usual electro-magnetically operated valve 61, associated with the means for causing the electrodes 10 and 12 to engage the work. This movement of the electrodes, as will be understood, places the system in readiness for the initiation of flow of welding current through the work.

Closure of contacts R1$b$ also completes obvious energizing circuits for the primary windings of transformers T3 and T4, associated, respectively, with the anode and grid circuits of valve V2. In view of the blocked condition of valve V2, the energization of transformer T3 is without immediate effect. The energization of transformer T4 introduces into the grid circuit of valve V2 a potential which opposes the potential of transformer T5 and enables all or a part of the energy stored in condenser C4 to discharge through the associated local circuit including the resistor $r2$. After a period determined by the characteristics of this discharge circuit, the potential of the grid of valve V2 falls to a conducting value and enables transformer T3 to pass current through valve V2 and energize relay R2. As described below, the energization of relay R2 initiates the flow of welding current and it will be understood, therefore, that the just-mentioned timing interval is relatively short, but is long enough to insure that the electrodes 10 and 12 are in properly clamped relation to the work before the flow of welding current is initiated.

Upon being energized, as aforesaid, relay R2 closes its normally open contacts R2$a$ and R2$b$. The latter contacts energize relay R4, which thereupon opens its back contact R4$a$ and closes its front contact R4$b$. The former action is without effect since contact R3$a$ is now open, but the latter action energizes relay R3. Upon being energized, relay R3 closes a self-holding contact R3$b$ and also closes its contact R3$a$, which action is without effect, since contact R4$a$ is now open. This sequencing of relays R3 and R4 is preparatory to the resetting operations which take place at the completion of the weld.

Closure of relay contact R2$a$, as aforesaid, completes an obvious energizing circuit for the coil 54 associated with the contactor valve 52, which circuit is subject only to the now closed back contact R5$a$ or relay R5. Valve 52 may be and preferably is a usual three-way valve, which in its normal off position connects its outlet 56 (which continuously communicates with the contactor) to the exhaust line 58, and disconnects its inlet 60. In the energized position of valve 52, on the other hand, passage 58 is disconnected from the outlet and inlet 56 and 60 and these parts are connected together. Inlet 60 is continuously connected through a flow controlling needle valve 62, a surge tank 63, and a pressure controlling regulator valve 64, to a suitable source 66 of compressed air.

Upon being energized, accordingly, valve 52 connects the contactor to the source 66 through the regulator 64, which source is thereupon effective, as described below, to move the carbon elements 30 and 32 into initial engagement with each other at a predetermined and preferably relatively low pressure. This action, as will be obvious, completes the welding circuit through leads 38 and 40, under which conditions the contactor represents a relatively high resistance in the circuit, enabling the flow of a minimum value of welding current. This minimum value of welding current may be, for example, of the order of 1% to 2% of the normal or full load value of welding current. As is also described in more detail below, the energization of valve 52 results in the energization of a three-way valve 70, which thereupon becomes effective, through a rate controlling needle valve 72, a surge tank 73, and a pressure controlling regulator valve 74, to complete an additional connection between the contactor C and the source of supply 66. This action results in increasing the pressure between the carbon elements 30 and 32 from the aforesaid minimum value to a maximum value, which maximum value and the rate of increase thereto, are both controllable.

The increase in pressure between the carbon elements correspondingly reduces the resistance of the welding circuit and correspondingly increases the value thereof.

In the broader aspects of the invention, definite time delay or other suitable means may be used to determine the over-all length of the welding period. As aforesaid, however, it is preferred to determine the welding period by means which responds to the temperature of the work, which means is illustrated as comprising the thermocouple elements 14 and 16 and the pyrometer Py.

The flow of welding current through the electrodes and the work raises the temperature thereof and causes the thermoelectric potential between the elements 14 and 16 to rise, as will be understood. When this thermoelectric potential rises to a predetermined value corresponding to a completed weld, the previously mentioned pyrometer Py operates to apply an operating potential to the coil of relay R5, which thereupon opens its contacts R5a and R5b.

The opening of contact R5a opens the previously traced circuit for winding 54, which action, as described below, disconnects the contactor C from the source of supply 66 and connects it to exhaust. This action causes the pressure on the carbon elements 30 and 32 to be decreased at a predeterminable rate. The reduction in pressure again progressively increases the resistance of the welding circuit from its minimum to a maximum value and ultimately enables the carbon elements to separate, interrupting the welding circuit and terminating the flow of welding current.

The above actions cause a reduction in temperature of the work and a consequent reduction in the thermoelectric potential. However, condenser C5, associated with relay R5, retains this relay in the energized position long enough to effect the resetting of the system, as hereinafter described. The opening of contact R5b interrupts the energizing circuit for transformer T3, which action immediately de-energizes relay R2 and results in the reopening of contact R2a, thus providing an additional interruption in the circuit of the valve solenoid 54.

The interruption of the welding circuit also de-energizes (at contact R2b) relay R4, which thereupon resumes the normal position, reclosing its contact R4a and reopening its contact R4b. The reopening of the latter contact is without immediate effect because of the self-holding circuit for relay R3, afforded by contact R3b. The reclosure of contact R4a completes, through the now closed contact R3a, an energizing circuit for the winding of transformer T2.

Upon being energized, transformer T2 supplies charging current to condenser C2 and also applies a blocking potential to the grid of valve V1, which action immediately renders this valve non-conducting. Upon being rendered non-conductive, valve V1 interrupts the further flow of current to relay R1, which relay, however, remains in the energized position for a predetermined "hold time" determined by the characteristics of the associated condenser C1. It will be understood that this "hold time" is sufficiently long to insure the setting of the work before the pressure is relieved from the electrodes.

At the expiration of the just-mentioned period, relay R1 resumes the de-energized position and reopens its contacts R1a and R1b, which latter action de-energizes the previously mentioned solenoid operated valve 61, thereby effecting the release from the work of the electrodes and completing the welding cycle.

The other operations produced by the reopening of contacts R1a and R1b are resetting operations. More particularly, the opening of contacts R1a de-energizes transformer T1, which action is without immediate effect in view of the now blocked condition of the valve V1. The opening of contact R1b interrupts the circuit for relay R3, causing this relay to resume its normal position; interrupts the energizing circuit for transformer T4, thereby enabling transformer T5 to again apply a blocking potential to the grid of valve V2; and introducing a further interruption into the circuit of transformer T3, which serves to maintain this transformer in the de-energized condition after relay R5 times out, recloses its contacts R5a and R5b, which actions are consequently without effect and may take place at any time after the de-energization of relay R1.

The re-opening of relay contact R3a interrupts the energizing circuit for transformer T2, which action enables the energy stored in condenser C2 to discharge through the local circuit including resistor r1. At the expiration of a period determined by the characteristics of this discharge circuit, the grid of valve V1 resumes a conducting value, thereby enabling a re-energization of relay R1 in response to a reclosure of the pilot switch P. Until the expiration of this period, however, usually referred to as the "off time," a reclosure of pilot switch P is ineffective to energize relay R1, and condenser C2, therefore serves to determine the interval which must elapse between successive welding operations. In accordance with usual practice, a throw-over switch S" may be provided, which, upon being closed, renders valve 61 and the other starting circuits directly responsive to the pilot switch P. Under these conditions, as will be understood, a new welding cycle may be initiated in response to closure of pilot switch P, immediately after the expiration of the hold-time period afforded by condenser C1.

Shortly after relay R1 resumes the de-energized position, condenser C5 times out, allowing contacts R5a and R5b to resume their illustrated positions, without effect.

Referring now particularly to Figs. 4 through 11, the carbon elements 30 and 32 are carried, respectively, by plates 100 and 102 which, like their associated carbons, may be and preferably are of generally cylindrical shape. These members are preferably formed of copper or other highly conductive material and are provided, respectively, with the previously mentioned radial extensions 34 and 36, which function as terminals for connection to the welding circuit. Preferably, the carbon elements are bonded to their respective plates 100 and 102, and if desired and as shown, the connections between these parts may be further protected by a series of clips 104 and 106, which are secured to the respective plates in circumferentially distributed relation therearound, and overlap the tapered edges of the corresponding carbon elements.

The lower plate 102 is rigidly secured to but is insulated from a base member 108 by means of a plurality of circumferentially distributed studs 110. The plate 100 is similarly rigidly secured to, but is insulated from, the vertically slidable piston member 112 by means of a plurality of circumferentially distributed studs 114. A plurality of springs 116 are interposed between the plate 100 and a corresponding plurality of adjusting screws 118, which screws are carried by the base 108. The springs continuously urge and normally hold the piston 112 in the position shown in Fig. 5, in which the carbon elements 30 and 32 are separated from each other, and in which position, as described above, the contactor is effective to interrupt the welding circuit.

The piston 112 is vertically slidable within a downwardly presenting cylinder space 120 provided at the base of the cylinder member 122. Member 122 is rigidly secured to the base 108 by a plurality of circumferentially distributed studs 124 and co-operating sleeves 126.

The upper portion of cylinder member 122 affords a reservoir 128 for the hydraulic fluid utilized to apply the proper pressure between the carbon elements. This fluid may be and preferably is oil. Reservoir 128 is provided with a usual filler tube 130 and a gauge 132 and is normally filled to approximately the level shown in the figures. Communication between the reservoir 128 and the cylinder space 120 is afforded through a series of circumferentially distributed openings 134 in a sleeve 136 which is press-fitted or otherwise rigidly secured into the central passage through the intermediate web portion 138 in the cylinder member 122.

Cylinder member 122 is surmounted by a booster cylinder 140 which is secured to the former by a plurality of circumferentially distributed studs 142. The booster cylinder 140 slidably receives a piston 144 which is continuously urged to and is normally retained in the illustrated upper position by means of a relatively heavy compression spring 146. Spring 146 is seated between the piston 144 and the web 138. In the illustrated upper position, piston 144 abuts the underside of an annular boss 148 provided at the underside of the associated cylinder space, leaving an annular cylinder space 150 into which an elastic fluid (in this case air) is introduced through the hereinafter described air circuit.

A tubular piston member 152 is rigidly secured to the piston 144 and normally projects into the previously mentioned sleeve 136 to the position shown in Fig. 5, in which position the supply openings 134 are exposed. It will be understood, however, that in response to the introduction of air into the cylinder space 150, piston 144 is forced downwardly, carrying with it the member 152. The latter movement closes off the openings 134 and traps a body of oil in the lower part of the sleeve 136 and in the cylinder space 120, through which body the pressure is transmitted to the piston 112 and the carbon elements 30 and 32.

The upper part of the booster cylinder 140 defines an auxiliary air cylinder 160 which slidably receives an auxiliary piston 162. Piston 162 carries a piston rod 164 which slidably projects through the piston 144 and the tubular piston member 152, and the lower end whereof normally bears against a wear plate 166 provided on the upper surface of the main piston 112. The return springs 116 act through piston 112 and the piston rod 164 to normally maintain piston 162 in its illustrated upper limit position, which position is adjustably determined by an adjustable stop member 168. Stop 168 is threaded into the removable cover 170 associated with cylinder 160 and is provided with an upwardly extending shank 172 by which it may be turned to a desired position to correspondingly determine the normal free spacing between the carbon elements 30 and 32.

The cover 170 is provided with an upwardly extending boss 180 to which the outlet 56 of the previously described valve 52 is secured by means of the collar 182. The cover 170 is also provided with a passage 184 which continuously connects the valve outlet 56 to the cylinder space 186 provided between the piston 162 and its associated cylinder 160. Referring particularly to Figs. 7 and 8, the cover 170 is also provided with a laterally extending boss 190 having a counterbore 192 in the outer end thereof. The boss 190 is provided with a passage 194 which directly communicates with the main air passage 184. The end of the passage 194 receives an adjustable needle valve 196 which controls the flow of air between passage 194 and the counterbore 192. The counterbore 192 has an outlet passage 204 which in turn is connected by pipe 206 to the operating inlet of the previously mentioned supplemental valve 70 shown in detail in Fig. 10.

Referring particularly to Fig. 10, valve 70 comprises a generally cylindrical body 210, within which a valve seat 212 is secured by the removable nipple 214. The nipple 214, the seat 212, and the valve body 210 cooperate to define two chambers 216 and 218, communication wherebetween is normally prevented by a poppet-type valve element 220. Valve element 220 is normally maintained seated by the pressure continuously applied against the face thereof through the line 222. As described in connection with Fig. 1, line 222 is continuously connected to the source 66 of compressed air through the control valves 72 and 74.

Valve element 220 is fixedly secured to a cooperating valve element 224 having a domelike surface 226 for co-operation with a seat 228 provided therefor at the lower side of the member 212. In the normal position of the parts shown in Fig. 10, the valve chamber 218 is continuously connected to the exhaust passage 230 through the lower end of the member 212.

The means for actuating valve elements 220 and 224 comprises a piston 232 which is slidably received in a sleeve 234 threaded into the lower end of the valve body 210. A light compression spring 236 is seated between the end of the piston 232 and the sleeve cover 238 and serves only, as will be understood, to maintain the upper end of the piston in continuous engagement with the lower end of the valve element 224.

The valve chamber 218 continuously communicates with a line 240 which continuously communicates through passages 242 and 244 with the previously described cylinder space 150 associated with the booster piston 144. Such cylinder space is thus normally connected to exhaust through the exhaust opening 230 of valve 70 and, as shown, a rate-controlling needle valve 231 may be provided to control the rate of flow through this exhaust circuit.

As will be recalled from previous description, the main valve 52 is normally de-energized, which action connects the outlet 56 thereof to exhaust through the exhaust passage 58, and isolates the inlet 60. Under these conditions passage 184 and cylinder space 186 are connected to exhaust, enabling the springs 116 to maintain the associated piston 162 in its illustrated position in which the carbon elements 30 and 32 are spaced apart from each other and are consequently effective to interrupt the welding circuit. Since passage 184 is connected to exhaust, the supplemental valve 70 is maintained closed by the pressure in line 22, and consequently the cylinder space 150 is connected to exhaust through the circuit afforded by valve 70.

As described before, the initiation of a welding operation results in energizing valve 52 which thereupon connects the main supply passage 184 to the source 66 through the regulating valves 62 and 64 (Fig. 1). In response to this action, air is introduced at a desired pressure to the cylinder space 186 and to the passage 194 associated with the needle valve 196. The pressure introduced into cylinder space 186 builds up therein at a rate determined by the needle valve 62 and ultimately attains a value sufficient to overcome the return springs 116 and move the carbon elements 30 and 32 into initial engagement with each other. Thereafter the pressure builds up in space 186 to the minimum pressure value determined by valve 64. In this case the pressure is applied to the carbon elements through the main piston 112, the piston rod 164, and the piston 162. The parts are preferably so adjusted as to enable this minimum pressure to build up relatively rapidly and to produce a resultant pressure between the carbon elements, which enables the flow between 1% and 2% of the normal full load welding current.

The above-described action is illustrated in Fig. 2, it being assumed that the control valve 52 is closed at the time $t_0$, at which time the carbon elements are separated. At this time the welding circuit resistance represented by the curve $R_c$ is at an infinite value, and the pressure between the carbon elements represented by the curve $P_c$ is at a zero value. At the time $t_1$ after the carbon elements 30 and 32 initially engage each other and the minimum pressure is attained in space 186, the pressure between the carbon elements attains a normal or starting value 260, and the welding circuit resistance attains the normal or starting value 262.

During the build-up of pressure in space 186, air passes through the needle valve 196 into the cylinder space associated with piston 232 of valve 70, and ultimately sufficient pressure builds up therein to open valve 70. It will be understood that valve 196 may be adjusted to cause valve 70 to open either prior to, simultaneously with, or after the pressure between the carbon elements 30 and 32 has attained the value determined by regulator valve 64. Preferably this action occurs not earlier but substantially simultaneously with the attainment of such pressure. The opening of valve 70 isolates the exhaust passages 230 and connects line 240 to the inlet 222. This action connects the booster cylinder space 150, associated with the booster piston 144, to the source 66 through valves 74 and 72, line 222, valve 70, line 240, and passages 242 and 244.

The resultant pressure in cylinder space 150 which builds up at a rate determined by valve 72 overcomes the effect of return spring 146 and forces piston member 152 downwardly. During the initial downward movement of piston member 152, oil is forced outwardly through the openings 134 into the reservoir space 128 without causing any material increase in the pressure applied to the main piston 112. As soon, however, as the lower end of piston member 152 closes off the openings 134, the previously described body of oil is trapped above the main piston 112. At this time the pressure applied to the piston 112 rises to a value determined by the then existing pressure in cylinder space 150 and by the ratio between the areas of pistons 144 and 152 on the one hand and the ratio between the areas of pistons 152 and 112 on the other hand. The pressure applied to the piston 112 continues to rise at a rate determined by the needle valve 72 and ultimately attains a value determined by the setting of the regulator valve 74. This progressive increase in pressure applied to piston 112 and consequently to the carbon elements 30 and 32 brings the pressure curve $P_c$ to a value 264, at a time $t_2$, and correspondingly brings the circuit resistance to a value 266, which value corresponds to a maximum flow of welding current. As will be appreciated, the time elapsing between the times $t_1$ and $t_2$ in Fig. 2, as well as the values 264 and 266, are variable in accordance with the setting of valves 72 and 74. This variation in the rate of increase in the welding current enables the preheating effect previously described.

It will be noted that by reason of the booster system, a pressure in cylinder 150 which is lower than the pressure in cylinder 186, is enabled to produce a pressure between the carbon elements 30 and 32, which is materially greater than the initial pressure produced by the action of piston 162. For example, utilizing relative piston areas as shown, a 90# setting of regulator valve 64 is appropriate for a range of settings of valve 74 between 30# and 80#, depending upon the desired maximum current flow.

It is noted that Fig. 9 illustrates the positions of the parts at the time $t_1$ in Fig. 2 and that Fig. 11 illustrates the physical positions attained by the parts at the time the piston 152 has closed off the exhaust passages 134. The latter position is of course maintained throughout the final increases in pressure.

The conditions corresponding to the time $t_2$ in Fig. 2 are maintained so long as valve 52 is maintained in the energized condition, during which the maximum welding current flows to and through the work. As described in connection with Fig. 1, this maximum flow of welding current brings the work to a welding temperature and actuates the thermoelectric elements which thereupon function to de-energize the valve. As soon as valve 52 is de-energized, the main air inlet passage 184 is connected to the exhaust passage 58 through the needle valve 80. It is usually preferred to maintain this needle valve in a wide-open condition, and as a consequence the pressure is quickly relieved from piston 162. This action which occurs at the time $t_3$ in Fig. 2 initiates a reduction in the pressure between the carbon elements as indicated at 270 and consequently initiates an increase in the resistance of the welding circuit, as indicated at 272.

In response to the exhausting of passage 184 the pressure applied to the piston 232 of valve 70 decreases to a value below that required to maintain valve 79 in the open position. As shown, the exhausting of the pressure applied to piston 232 takes place through the needle valve 196. If it is desired to insure a more prompt reclosing of valve 70 than is afforded by this exhaust circuit, the modification shown in Fig. 12 may be utilized in which a usual ball-check valve 197 is connected, by lines 199 and 201, directly in parallel with the needle valve 196. It will be noted that this check valve remains closed during the building up of pressure against piston 232, but is substantially free to open and permit an unrestricted decay of pressure as soon as the main valve 52 is de-energized.

When valve 70 recloses, valve element 220 isolates cylinder space 150 from the source 66 and connects this cylinder space to exhaust through the passage 230. As shown in Fig. 10, passage 230 has associated with it a rate-controlling needle valve 231 which, as will be understood, may be adjusted to desirably control the rate at which air is exhausted from the cylinder space 150.

As the pressure in cylinder 150 decreases, the pressure between the carbon elements is correspondingly decreased, and the resistance of the welding circuit is correspondingly increased. Ultimately a pressure in cylinder space 150 is reached, at which piston 144 is unable to overcome the biasing effect of spring 146, at which time piston member 152 and piston 144 are returned to the starting position shown in Fig. 5. During the course of this decrease in air pressure also a point is reached, represented by the time $t_4$ in Fig. 2, at which the return springs 116 are enabled to separate the carbon elements 30 and 32, thereby interrupting the welding circuit and, through the main piston 112, restore piston 162 to the starting position shown in Fig. 5. Under certain rather limited conditions, the plate 100 may move so that the element 30 carried thereby is maintained in a position relative to the element 32 so that the element 30 disengages from the element 32 at all points at once; however, generally there will be some canting of element 30 whereby the area thereof in contact with element 32 will become progressively less until final separation occurs with a contacting area considerably less than the full area of the two elements. This canting of the element 30 is advantageous in that it provides for a greater resistance to current flow through the valve 52 before complete interruption of the circuit controlled thereby.

Referring particularly to Fig. 2 it will be noted that if the welding circuit were entirely noninductive the current in the welding circuit would immediately rise from a zero value to a value 274 at the time $t_1$, would thereafter rise at the rate indicated at 276, and would attain its maximum values at the time $t_2$. By virtue of the inductive character of the welding circuit, however, the welding current rises at the rate indicated by the full-line curve portion $s'$ and thereafter flows at the maximum value represented by the portion $s$ of the curve. Also, if the welding circuit were noninductive, the current I would decrease as indicated by the dotted portion 278 of the curve, such decrease being initiated at the time $t_3$. By virtue of the inductive character of the circuit, however, the decrease in current lags the decrease in pressure between the carbon elements, and, consequently, if the carbon elements were allowed to separate too promptly following the de-energization of the main valve 52, the welding current would be at a value in excess of the desired minimum value at such time of separation. The amount of this excess would vary with variations in the character of the welding circuit. However, by adjusting needle valve 231 so as to provide a sufficiently gradual decay of pressure in cylinder space 150, the welding current is enabled to decay to a safe minimum value before the carbon elements are allowed to separate. Bearing in mind, as above stated, that current magnitudes of the order of 30,000 to 50,000 amperes may be involved, the importance of this feature will be readily appreciated. In all cases, and particularly in cases involving such high current values, it is preferred to set the opening rate of the contactor in relation to the characteristics of the work circuit so as to bring the current to a value which is a minor fraction of the maximum current value, immediately prior to the separation of the carbon elements. By way of example, it is preferred to limit such minimum current to a figure not in excess of 5% of the maximum current value.

Summarizing the above system accordingly it will be appreciated that generically it involves initially closing the welding circuit, increasing the value of welding current from a starting value to a desired maximum value at a rate which is adjustable and is consistent with the requirements of the work being welded, initiating a decrease in the value of the welding current at the conclusion of the weld, and maintaining the continuity of the circuit until the current has decayed to a sufficiently low value to enable the circuit to be safely interrupted. The rate of decrease of current may be the same or different from the rate of increase and, depending upon the relation between the relative adjustments of the supply and exhaust circuits, may be the same or different from the initial or starting minimum value of current flow.

In certain instances, for example in seam-weldin operations, it may be desirable to modulate the current so as to provide a succession of pulsations. This may be done, of course, by actuating the control system so as to produce a succession of cycles, as shown in Fig. 2, without allowing the pressure to be relieved from the electrodes in the intervals between successive pulses of current. Alternatively and preferably, the current is not interrupted in the intervals between successive pulsations, but instead is merely reduced to a relatively low value.

Although only a single specific embodiment of the invention has been described in detail, it will be appreciated that various changes may be made therein without departing from the spirit and scope thereof.

What is claimed and desired to be secured by United States Letters Patent is:

1. In a switch mechanism, a base member, a first carbon plate carried by said base member and having a contact surface, a piston and cylinder combination carried by said base member, a second carbon plate having a contact surface engageable with said first plate surface, force multiplying means arranged to transmit the force exerted by said combination to said second carbon plate whereby said surfaces are brought into engagement under a desired pressure, and spring means carried by said base member for urging said carbon plates in a separating direction.

2. In a switch mechanism, a base member, a first carbon plate carried by but insulated from said base member and having a contact surface, a piston and cylinder combination carried by said base member, a second carbon plate held against lateral movement relative to said first plate by said base member and having a contact surface engageable with said first plate surface, force multiplying means exerting a reaction force on said base member and arranged to transmit the force exerted by said combination to said second carbon plate whereby said surfaces are brought into engagement under a desired pressure, and a plurality of equally spaced springs carried by said base member for urging said carbon plates in a separating direction.

3. In a switch mechanism, a plate-like base member, a first disk supporting member carried rigid with but electrically insulated from said base member, a first relatively thin carbon disk supported by and in electrical conducting relation with said first supporting member and having a contact making surface, a second disk supporting member, a second relatively thin carbon disk supported by and in electrical conducting relation with said second supporting member and having a contact making surface engageable with said first disk surface, spaced resilient members carried by said base member for urging said second supporting member and its associated disk out of engagement with said first disk, a piston cylinder member carried by said base member, and overlying said second supporting member, a piston in said cylinder member, a wall member positioned between said cylinder member and said second supporting member, and force multiplying means associated with said wall member and actuated by said piston for moving said second contact surface into engagement with said first contact surface.

4. In a switch mechanism, a plate-like base member, a first disk supporting member carried rigid with but electrically insulated from said base member, a first relatively thin carbon disk supported by and having one face in electrical conducting relation with said first supporting member and having an opposite face, a second disk supporting member, a second relatively thin carbon disk supported by and having one face in electrical conducting relation with said second supporting member and having an opposite face surface engageable with said first disk other face, spaced resilient members carried by said base member for urging said second supporting member and its associated disk out of engagement with said first disk, a piston cylinder member carried by said base member, and overlying said second supporting member, a piston in said cylinder member, a wall member positioned between said cylinder member and said second supporting member, and force multiplying means exerting a reaction force on said wall member and actuated by said piston for moving said second contact other face into engagement with said first contact other face.

5. In a switch mechanism, the combination of a pair of co-engageable conductive carbon-pile elements, the pressure between which determines the electrical resistance thereof, means normally retaining said elements in spaced, circuit interrupting relation to each other, and control means for moving said elements into engagement with each other and for thereafter building up a pressure between them.

6. The combination of claim 5, wherein the control means further includes means to effect said build-up of pressure at a gradual and predetermined rate.

7. Switch mechanism including a pair of co-engageable conductive carbon-pile elements, the pressure between which determines the electrical resistance thereof, means for applying a said pressure between said elements, and control means for gradually reducing said pressure at a gradual and predetermined rate and for thereafter separating said elements so as to interrupt said circuit.

8. In a switch mechanism, the combination of a pair of co-engageable conductive, carbon-pile elements, the pressure between which determines the electrical resistance thereof, and a combined hydraulic and pneumatic booster system for controlling said pressure.

9. In a switch mechanism, the combination of a pair of co-engageable conductive carbon-pile elements, the pressure between which determines the electrical resistance thereof, means including a first fluid motor for actuating said elements between engaged and separated positions, and means including a hydraulic-pneumatic booster system for determining the pressure of said engagement.

10. In a switch mechanism, a supporting structure, a first electrical terminal member carried by but insulated from said structure and having a carbon surface, a complemental terminal member adjacent said first terminal member and having a carbon surface engageable with said first terminal member surface, an outer and inner piston and cylinder carried by said structure and overlying said complemental terminal member, means rigidly connecting said complemental member to but electrically insulating said complemental member from said inner piston, said inner cylinder having an end wall underlying said outer piston and having an aperture extending therethrough, a hollow cylindrical sleeve sealing said aperture and having a portion extending outwardly from said end wall toward said outer piston, means providing a fluid reservoir above said end wall, said sleeve having an outwardly opening port through its side walls outwardly of said end wall and communicatively connecting said reservoir with the chamber of said inner cylinder, said outer piston having a plunger guided for reciprocal movement in said sleeve and normally maintaining the lower end portion of said plunger outwardly of said port, and means whereby fluid pressure may be supplied to said outer cylinder for moving said outer piston and said plunger inwardly into said sleeve whereby fluid flow through said port is prevented and the fluid trapped in said inner cylinder is placed under pressure for moving said inner piston toward said first terminal member so that said carbon surfaces are brought into firm engagement.

11. In a switch mechanism, a supporting structure, a first electrical terminal member carried by but insulated from said structure and having a contact surface, a complemental terminal member adjacent said first terminal member and having a contact surface engageable with said first terminal member surface, an outer and inner piston and cylinder carried by said structure and overlying said complemental terminal member, means rigidly connecting said complemental member to but electrically insulating said complemental member from said inner pistons, said inner cylinder having an end wall underlying said outer piston and having an aperture extending therethrough, a hollow cylindrical sleeve sealing said aperture and having a portion extending outwardly from said end wall toward said outer piston, means providing a fluid reservoir above said end wall and around said sleeve, said sleeve having port through its side walls outwardly of said end wall and communicatively connecting said reservoir with the chamber of said inner cylinder, said outer piston having a plunger having a piston-tight fit within and reciprocally movable within said sleeve, said plunger being of lesser cross-sectional area than the cross-sectional area of said outer piston, means normally maintaining the lower end portion of said plunger outwardly of said port, means whereby fluid pressure may be supplied to said outer cylinder for moving said outer piston and said plunger inwardly into said sleeve whereby fluid flow through said ports is prevented and the fluid trapped in said inner cylinder is placed under pressure for moving said inner piston toward said first terminal member so that said carbon surfaces are brought into firm engagement.

12. In a switch mechanism, a supporting structure, a pair of carbon disks, one of said disks being carried by but insulated from said structure, a first and second fluid pressure actuator carried by said structure and arranged in tandom above said disks, each of said actuators including an inverted cup-shaped member having an end wall and an annular side wall defining a piston chamber opening toward said disks, each said actuator having a piston in its chamber, said actuators having end walls with apertures extending therethrough, a hollow sleeve positioned within and sealed to the periphery of said first actuator end wall aperture and extending above said first actuator end wall toward said second actuator, said sleeve having a port extending through a wall thereof above said first actuator end wall, means providing a fluid chamber communicating with said port whereby fluid may flow from said reservoir into said first actuator piston chamber, a plunger having one end portion received within said sleeve and having a piston-tight fit therewith and having its other end portion operatively connected to said second actuator piston, means normally maintaining said second actuator piston and said plunger in a position to permit fluid flow through said port, said second actuator piston being operable upon fluid pressure being admitted to said second actuator piston chamber to move said plunger to close said port and to place the fluid in said first actuator piston chamber under pressure, said second actuator piston and said plunger having apertures therethrough aligned with said second actuator end wall aperture, a thrust member extending through said aligned apertures and having one end portion operably engageable with said first actuator piston and another end portion extending outwardly of said second actuator end wall, means for exerting a thrust on said thrust member whereby said thrust member will move to actuate said first actuator piston, and means operably connecting said first actuator piston to the other of said disks whereby said other disk may be brought into engagement with said one disk to control flow of electric current therebetween.

13. In a switch mechanism, a supporting structure, a pair of carbon disks, one of said disks being carried by but insulated from said structure, a plurality of fluid pressure actuators carried by said structure and arranged in tandom above said disks, each of said actuators including an inverted cup-shaped member having an end wall and an annular side wall defining a piston chamber opening toward said disks, each said actuator having a piston in said chamber, the first and second of said actuators having end walls with apertures extending therethrough, a hollow sleeve positioned within and sealed to the periphery of said first actuator end wall aperture and extending above said first actuator end wall toward said second actuator, said sleeve having a port extending through a wall thereof above said first actuator end wall, means providing a fluid chamber communicating with said port whereby fluid may flow from said reservoir into said first actuator piston chamber, a plunger having one end portion received within said sleeve and having a piston tight fit therewith and having its other end portion operatively connected to said second actuator piston, means normally maintaining said second actuator piston and said plunger in a position to permit fluid flow through said port, said second actuator piston being operable upon fluid pressure being admitted to said second actuator piston chamber to move said plunger to close said port and to place the fluid in said first actuator piston chamber under pressure, said second actuator piston and said plunger having apertures therethrough aligned with said second actuator end wall aperture, a thrust member extending through said aligned apertures and having one end portion operably engageable with said first actuator piston and another end portion operably connected to the piston of a third of said actuators whereby when fluid is admitted to said third actuator piston chamber said third actuator piston will move said thrust member to actuate said first actuator piston, and means operably connecting said first actuator piston to the other of said disks whereby said other disk may be brought into engagement with said one disk to control flow of electric current therebetween.

14. In a switch mechanism, the combination of a pair of co-engageable conductive carbon-pile elements, the pressure between which determines the electrical resistance thereof, means normally retaining said elements in spaced, circuit interrupting relation to each other, and a pair of actuators, one of said actuators being operable for moving said elements into engagement with each other and a second of said actuators being operable to thereafter build up a pressure between them.

15. In a switch mechanism, the combination of a pair of co-engageable relatively movable conductive carbon-pile elements, the pressure between which determines the electrical resistance thereof, a piston member operatively connected to and for moving one of said elements, means providing a piston chamber for receiving said member, a fluid in said chamber the pressure of which regulates the pressure between said elements, a first means for moving said piston member to apply pressure between said elements, and a second means for increasing the pressure of said fluid.

16. The combination of claim 15 in which said fluid is a liquid and in which said first moving means is a mechanical actuator.

17. The combination of claim 15 in which said piston chamber is provided with an end wall having an aperture therethrough overlying said piston member and said fluid is located between said end wall and said piston member, and in which said second means is associated with said aperture for closing the flow of fluid therethrough and for thereafter increasing the pressure of said fluid within said chamber.

18. In a switch mechanism, the combination of a pair of co-engageable relatively movable conductive carbon-pile elements, the pressure between which determines the electrical resistance thereof, a first supporting member for carrying one of said elements, a second supporting member for carrying the other of said elements whereby said elements are in contiguity; said second member having walls defining a piston chamber, a piston in said chamber operably associated with said other element, one of said walls having an aperture therethrough, means providing a liquid reservoir adjacent said aperture whereby when said aperture is open for liquid flow the portion of said chamber on the pressure side of said piston will be completely filled with liquid, means for initially moving said piston member to cause said other element to engage said one element, and means for thereafter closing liquid flow through said aperture and thereafter increasing the pressure exerted by said liquid in said chamber portions for exerting an increased pressure on said piston.

19. In a switch mechanism, the combination of a pair of co-engageable conductive carbon-pile elements, the pressure between which determines the electrical resistance thereof, said elements being relatively thin and disklike, platelike current conducting members associated with each of said elements, means for securing said elements to their respective members in face-to-face relation whereby said members will distribute current to said contiguous faces of its respective said element, means normally retaining said elements in spaced circuit interrupting relation to each other, and control means for moving said elements into engagement with each other and for thereafter building up a pressure therebetween.

FRED H. JOHNSON.
CHESTER F. LEATHERS.

REFERENCES CITED

The following references are of record in the file of this patent:

UNITED STATES PATENTS

| Number | Name | Date |
| --- | --- | --- |
| 2,347,695 | Leathers | May 2, 1944 |
| 2,400,992 | Hebeler | May 28, 1946 |
| 2,406,449 | Whittaker | Aug. 27, 1946 |